Nov. 5, 1940.  C. N BATSEL  2,220,198
MONITORING SYSTEM
Filed Dec. 3, 1937
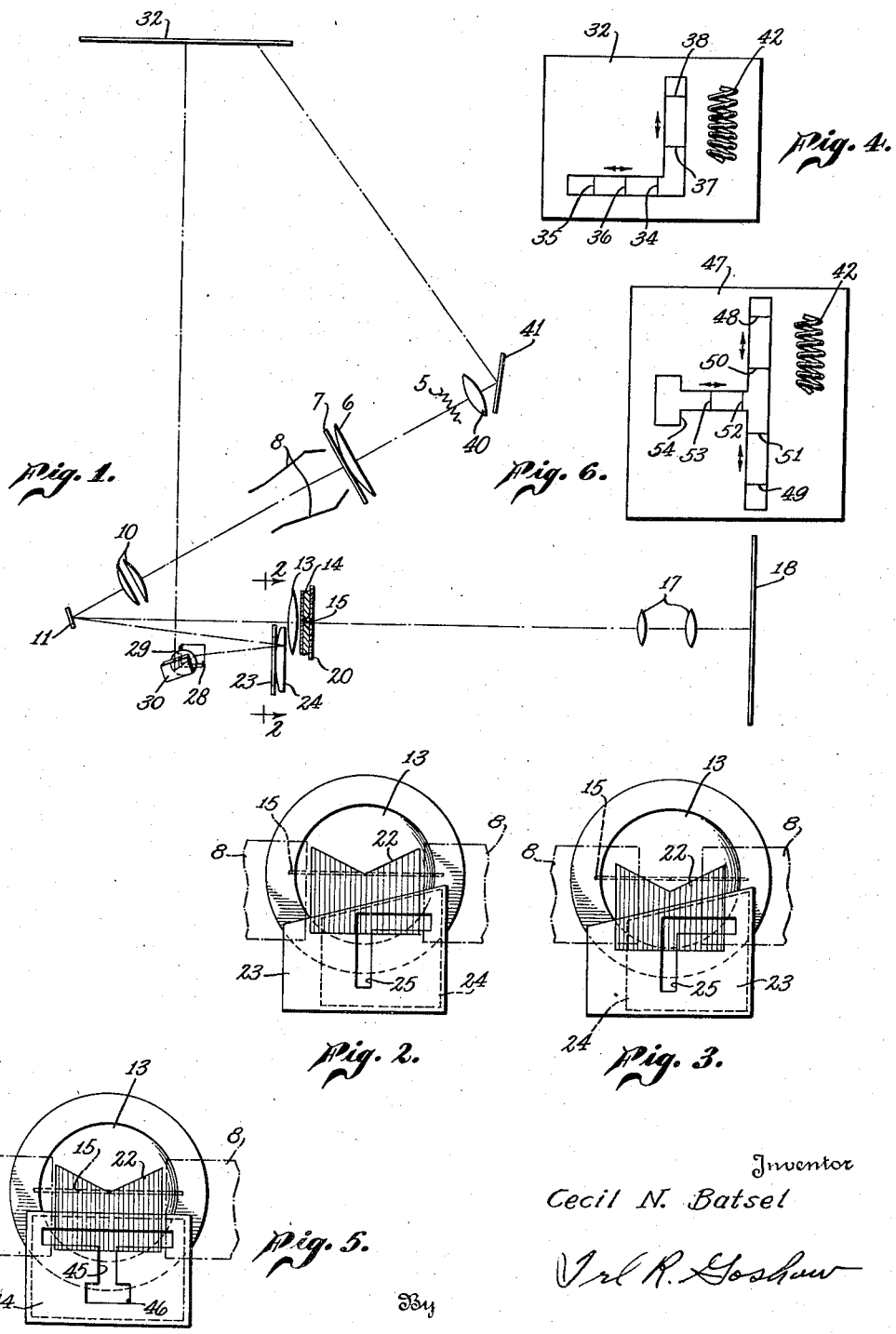
Inventor
Cecil N. Batsel
By Vrl R. Goshow
Attorney Patented Nov. 5, 1940

2,220,198

UNITED STATES PATENT OFFICE 2,220,198

MONITORING SYSTEM

Cecil N. Batsel, Los Angeles, Calif., assignor to Radio Corporation of America, a corporation of Delaware Application December 3, 1937, Serial No. 177,907

8 Claims. (Cl. 179—100.3)

This invention relates to the art of electro-optically recording sound and particularly to a method of and means for monitoring the recording operations whereby an operator is apprized at all times of the condition of the vital operating elements of the system.

There are a number of different general types of sound recording systems known in the art, two of which being usually referred to as sound-on-disc and sound-on-film. The latter type is a photographic method of recording which may be divided into two classes, such as variable density and variable area. The present invention concerns itself with the variable area type of sound recording on film wherein a light beam is modulated by vibrating or moving it relative to the longitudinal advancement of the film. That is, a source of light is concentrated into a beam, the beam being projected onto the film with the aid of an intermediate, disposed mirror which is vibrated in accordance with the instantaneous values of the amplitudes of the sound waves, thus correspondingly vibrating the beam. The invention is applied to a system in which noise reduction is involved, the noise reduction portion constituting of a pair of shutters which are moved to vary the width of the beam in accordance with the envelope of the sound waves being recorded. A system of this general nature is disclosed in co-pending application Serial No 82,418, filed May 29, 1936.

The primary object of the present monitoring system, therefore, is to visually indicate the position and condition of the light beam with respect to the film during the actual recording operation as well as during the non-recording periods.

Another object of the invention is to indicate to an observer the degree of variation or modulation of the light beam and simultaneously indicate the degree of effective noise reduction.

A further object of the invention is to facilitate the adjustment of the modulating and noise reduction portions of the recording system with respect to the film.

A further object of the invention is to facilitate the observation of the operation of the modulating and noise reduction portions of the system with respect to the film.

A further object of the invention is to facilitate the observation of the different degrees of modulation and noise reduction.

In one preferred method of variable area recording, a pre-formed light beam is reflected by a galvanometer mirror which is vibrated in accordance with the instantaneous values of the sound waves so that this light beam is moved in a direction longitudinally of the movement of the film. As the beam is V shaped and is impressed on a slit transversely positioned with respect to the film, the effective movement of the light reaching the film is normal to the movement of the film. It is well known that the sound track portion of the film has a definite predetermining width and occupies a definite predetermined position, transversely of the film. The present invention, therefore, readily permits an operator to know at all times the position of the modulating light beam with respect to this sound track portion of the film.

In this system of sound recording, the effective width of the sound track portion of the film is varied in accordance with the envelope of the sound waves. This is usually accomplished by shutters as is well known in the art. The present invention, therefore, also facilitates the observation of the movements of these noise reduction shutters as they affect the light beam impressed upon the sound track portion of the film.

Although the novel features which are believed to be characteristic of this invention are pointed out with particularity in the claims appended herewith, the manner of its organization and the mode of its operation will be better understood by referring to the following description read in conjunction with the accompanying drawing forming a part thereof, in which Figure 1 is a diagrammatic drawing of a variable area recording system embodying the invention, Figures 2 and 3 are detailed views of one aperture embodiment of the invention taken along the line 2—2 of Fig. 1, showing two positions of the light beam, Figure 4 shows an observation screen cooperating with the embodiment shown in Figs. 2 and 3, Figure 5 is a second aperture embodiment in accordance with the invention, and Figure 6 shows an observation screen for the modification of Fig. 5.

Referring now to Fig. 1, light rays are produced by a filament 5 and collected by a lens 6 into a beam, the boundaries of which are defined by a mask 7 of the shape of the light beam shown in Figs. 2, 3 and 5, at 22. A pair of noise reduction shutters shown diagrammatically at 8 variably define the overall width of the

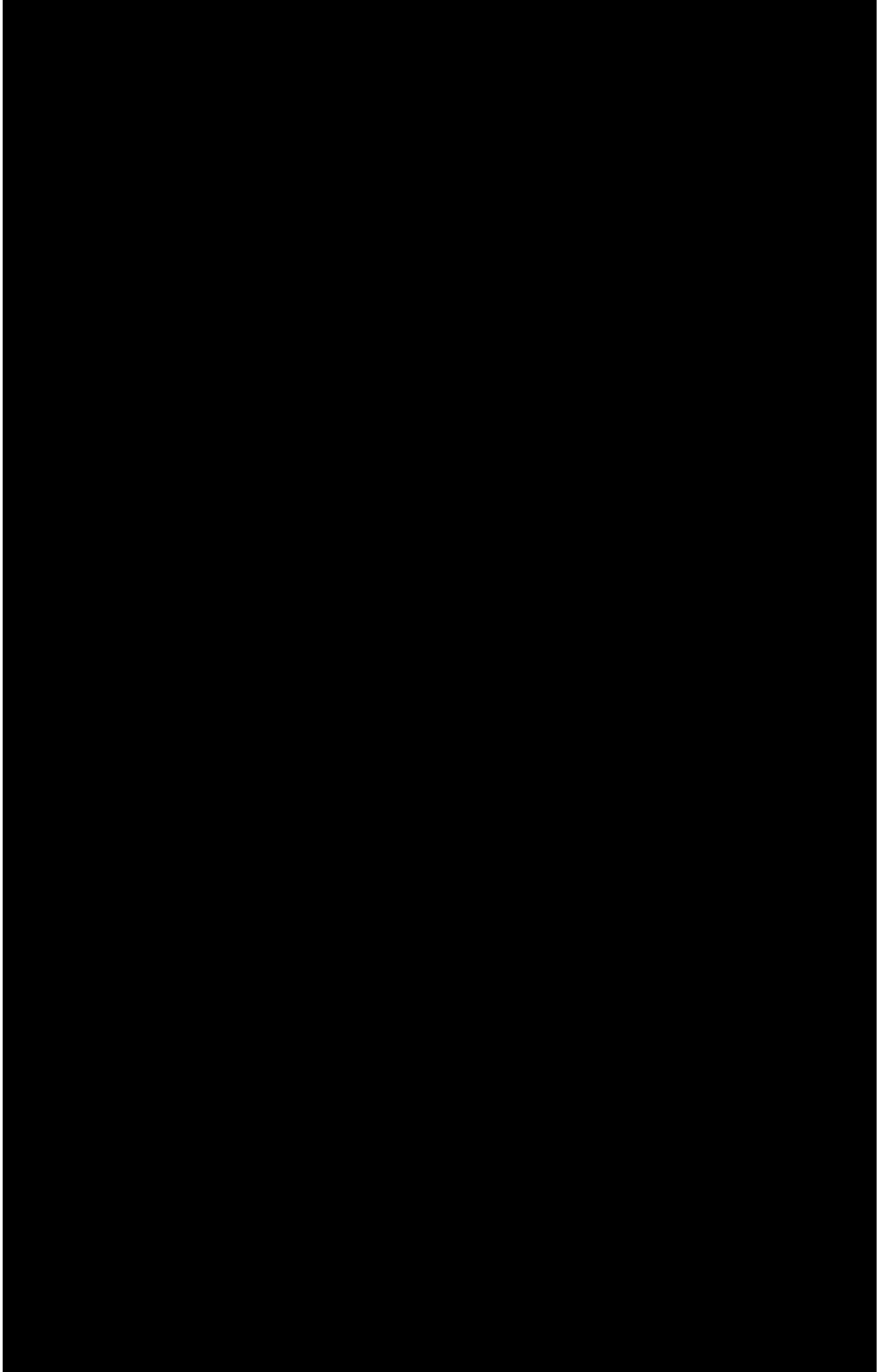

and equal variations. However, it is possible that one shutter may become disconnected or not operate similarly to its mate, and by the use of the T aperture, observation of both shutters may be made at all times, the marks 48 and 49 on the vertical portion of the image representing the 100 percent modulation points, and the marks 50 and 51, the normal bias positions of the shutters. Thus, substantially every vital operation or condition of the light modulating system is under continuous observation in an efficient manner, screen 47 also having an image of the light source filament projected thereon as on screen 32.

It is to be noted that Fig. 1 has been drawn for purposes of explanation and that in actual practice the light rays from the filament 5 to the mirror 11, to the film 18 and from the mirror 39 to the card 32, and from mirror 41 to card 32, are in a substantially horizontal plane or planes, while the elements 13, 14, 15, 23 and 24 are in a vertical plane. Also, the line of light from the mirror 29 to the mirror 30 and the line of light from the filament 5 to the mirror 41 are in substantially vertical planes, although it is to be understood that the light may be reflected in any direction desired.

I claim as my invention:

1. A sound recording system comprising means for producing a beam of light, means for projecting a portion of said beam of light upon a motion picture film, a mask having a slit therein intermediate said light beam producing means and said film, means for vibrating said light beam across said slit in accordance with sound waves to be recorded, a reflector positioned adjacent said slit for intercepting a portion of said light beam projected toward said slit mask, an aperture shield in front of said reflector to permit light to reach said reflector and to permit light to be reflected therefrom to an observation medium, said aperture having one part thereof parallel to the direction of vibration of said beam, and another part perpendicular thereto.

2. A sound recording system comprising means for producing a light beam, means for defining said beam into predetermined dimensions, means for projecting a portion of said beam to a motion picture film, means for vibrating said beam in a direction of movement of said film in accordance with the instantaneous values of the sound waves being recorded, means for varying the overall width of said beam in accordance with the envelope of the sound waves being recorded, a mask having a slit therein, said slit being positioned intermediate said film and said beam vibrating means, a mirror positioned intermediate said slit and said beam vibrating means, a mask positioned in front of said mirror having an L shaped aperture therein, one arm of which is parallel to the direction of said vibrations of said beam, and the other arm of which is perpendicular to said direction of vibrations, and means for imaging said L aperture upon an observation medium, one arm of said L aperture intercepting one edge of said vibrating beam and the other arm of said aperture intercepting another edge of said beam modified in accordance with the envelope of the sound waves being recorded.

3. A noise reduction system in accordance with claim 2 in which means are provided for projecting an image of said light producing means adjacent the image of said L shaped aperture.

4. A sound recording system comprising means for producing a light beam, means for defining the beam into definite dimensions, means for projecting a portion of said light beam onto a film, means for vibrating said light beam with respect to said film, a mask having a slit therein intermediate said film and said vibrating means, said vibrating means varying the motion of said beam in accordance with the instantaneous values of the sound waves being recorded, means for varying the overall width of said beam in accordance with the envelope of said sound waves being recorded, means positioned intermediate said slit and said vibrating means for reflecting a portion of said light beam, a mask in front of said reflecting means having a T shaped aperture therein, and means for projecting an image of said T aperture upon an observation medium, one edge of said light beam vibrating over one arm of said T aperture and two edges of said light beam vibrating over the other arm of said T aperture.

5. A sound recording system in accordance with claim 4 in which the beam vibrating means varies the beam over the first-mentioned arm of said T aperture, and said beam width varying means varies the edges of said beam over the other arm of said aperture.

6. A sound recording system in accordance with claim 4 in which the first-mentioned arm of said T aperture is varied in width at one point of permissible maximum variation of said beam.

7. A sound recording system in accordance with claim 4 in which means are provided for projecting an image of the light producing means upon said observation means adjacent the image of said T aperture.

8. A sound recording system comprising means for producing a light beam, means for defining the beam into definite dimensions, means for projecting a portion of said light beam onto a film, means for vibrating said light beam with respect to said film, a mask having a slit therein intermediate said film and said vibrating means, said vibrating means varying the motion of said beam in accordance with the instantaneous values of the sound waves being recorded, means for varying the dimensions of said beam in accordance with the envelope of said sound waves being recorded, means positioned intermediate said slit and said vibrating means for reflecting a portion of said light beam, a mask in front of said reflecting means having an aperture therein, and means for projecting an image of said aperture upon an observation medium, one edge of said light beam vibrating over one portion of said aperture of said mask, and another edge of said light beam vibrating over another portion of said aperture of said mask.

CECIL N. BATSEL.